(12) United States Patent
Oyama

(10) Patent No.: US 6,357,480 B1
(45) Date of Patent: Mar. 19, 2002

(54) PRESSURE CONTROL VALVE

(75) Inventor: Hitoshi Oyama, Itami (JP)

(73) Assignee: Sumitomo Electric Industries, LTD, Osaka (JP)

( * ) Notice: Subject to any disclaimer, the term of this patent is extended or adjusted under 35 U.S.C. 154(b) by 0 days.

(21) Appl. No.: 09/649,180

(22) Filed: Aug. 29, 2000

(30) Foreign Application Priority Data

Aug. 31, 1999 (JP) ............................................ 11-244581

(51) Int. Cl.⁷ .............................................. F15B 13/044
(52) U.S. Cl. ....................... 137/625.65; 251/50; 251/52
(58) Field of Search ....................... 137/625.65; 251/50, 251/52

(56) References Cited

U.S. PATENT DOCUMENTS

| | | | | |
|---|---|---|---|---|
| 3,896,856 A | * | 7/1975 | Schumacher et al. | 137/625.65 |
| 4,821,773 A | * | 4/1989 | Herion et al. | 137/625.25 |
| 5,174,338 A | * | 12/1992 | Yokota et al. | 137/625.65 X |
| 5,375,506 A | | 12/1994 | Hashida et al. | |
| 5,460,199 A | | 10/1995 | Takata et al. | |
| 5,524,659 A | | 6/1996 | Takata et al. | |
| 5,609,400 A | | 3/1997 | Hashida | |
| 5,894,860 A | * | 4/1999 | Baldauf et al. | 137/625.65 |
| 6,202,697 B1 | * | 3/2001 | Oyama et al. | 137/625.65 |

FOREIGN PATENT DOCUMENTS

| | | | | |
|---|---|---|---|---|
| JP | 63-208910 | * | 8/1988 | 137/625.65 |
| JP | 4-125374 | | 4/1992 | |

OTHER PUBLICATIONS

English Language Abstract of JP 4–125374.

\* cited by examiner

*Primary Examiner*—Gerald A. Michalsky
(74) *Attorney, Agent, or Firm*—Greenblum & Bernstein, P.L.C.

(57) ABSTRACT

A valve of the present invention has housing and a piston member. The piston member is housed in the housing so that it moves between first and positions. The housing includes a piston chamber for guiding the piston member between first and second positions while keeping a sealing engagement with the piston chamber. First and second chambers are positioned adjacent to opposite ends of the piston member so that volumes of first and second chambers are changed depending upon a movement of the piston member. First and second ports are connected when the piston member takes the first position but disconnected when the piston member takes the second position. Third port is connected with the first and second chambers but disconnected from the first and second ports when the piston member takes the first position but connected with the second port when the piston member takes the second position. A partition is defined between the first and second chambers. Also, the partition has an orifice for connecting between the first chamber and the third port.

13 Claims, 5 Drawing Sheets

PRESSURE CONTROL VALVE

FIELD OF THE INVENTION

The present invention relates to a pressure control valve for controlling a pressure of a fluid substance to be fed through a fluid passage or channel. Also, the present invention relates to a pressure control valve preferably for use with an automobile brake system, for example.

BACKGROUND OF THE INVENTION

Recently, a fluid pressure control system for controlling a pressure of an operating or working fluid into a predetermined value, in particular for use in an automobile brake station tends to employ a power driven pressure-source in order to provide a highly precise operational control to the automobile. Another system with an accumulator in the pressure source may be required according to a content of the control.

Specifically, for the pressure control valve system mounted in a connection between the pressure source and wheel cylinder, a highly precise pressure control is required for the wheel cylinder. For this purpose, a proportional pressure control valve system capable of controlling the fluid pressure in a precise manner according to an electric instruction tends to be employed instead of the conventional, simple switching or shutdown valves.

A majority of the conventional proportional pressure control valves employs an electromagnetic spool valve in which a spool or piston is moved to change fluid passages and/or control the open ratio of the passage. Disadvantageously, sensitive spools can move back and forth along its longitudinal direction excessively to cause vibrations. To overcome this problem and then to attain a steady-state spool valve, an improved spool valve with an orifice that defines, a fluid chamber together with the end portion of the spool is proposed in the Japanese Patent Unexamined Laid-Open; Publication JP(A) No. 4-125374, for example.

Referring to FIG. 5, there is shown a conventional proportional pressure control valve generally indicated by reference numeral 100. The pressure-control valve 100 has a housing 101 with an elongated piston chamber 102 formed therein and extending vertically. The piston chamber 102 receives a piston or spool 103 therein so that the spool 103 is guided by the piston chamber 102 to move ups and downs. The housing 101 has four ports 104–107 each connected with the piston chamber 102. Also, the housing 101 includes upper and lower fluid chambers 108 and 109 adjacent to the opposite, top and bottom end portions of the spool 103, respectively. On the other hand, the spool 103 has an axial passage 110 extending from its top end positioned adjacent to the upper chamber 108. In the vicinity of an open top end of the passage 110, the spool 103 has a partition with a small hole or orifice 111 that connects between interior and exterior of the passage 110. The spool 103 also has transverse holes 112 adjacent to the lower fluid chamber 109 so that the passage 110 is connected with the lower fluid chamber 109 through the holes 112. Further, the spool 103 is formed in its outer peripheral surface with upper and lower passages 113 and 114. The spool 103 so constructed is forced upward by a bias spring 115 and, a connecting mechanism 116 for the mechanical connection between the spool 103 and bias spring 115, so that it sakes an elevated position (not shown) in the housing 101.

With the arrangement, a fluid substance such as pressurized oil is supplied into the port 105. Thee fluid flows through the lower fluid chamber 109, transverse holes 112 and then fluid passage 110 into the upper fluid chamber 108. As a result, the fluid pressure applies on the top surface of the piston 103. This causes the spool 103 to move a downward direction into a lowered position shown in FIG. 5, which in turn allows the ports 106 and 107 to be connected to one another through the peripheral pass age 114.

The operating fluid is then drawn from the port 104. In this instance, the operating fluid is transported from the upper fluid chamber 108, passage 110, transverse hole 112 and lower fluid chamber 109 and then discharged from the port 104, which causes the spool 103 to move upward. As a result, the passage 114 is closed and, on the other hand, another passage 113 is opened to connect between ports 106 and 107.

The flow of the operating fluid between the fluid passage 110 and the upper fluid chamber 108 is restricted at the orifice 111, which prevents a rapid translation of the spool 103. This ensures a steady-state movement of the spool 103. Also, by adjusting the size of the orifice 111, the translation velocity of the spool 103 can be changed.

Disadvantageously, the proportional pressure-control valve system so constructed may hold air or bubbles in the fluid chambers which would cause vibrations of the spool. Typically, for removing bubbles from the upper fluid chamber 108, the operating fluid within the housing 101 may be drawn through the ports and then exchanged with another operating fluid. However, such operation for removing bubbles can be done only when the valve system is out of operation and requires additional and complicated operations. Also, the removed bubbles may be fed back into the passages or chambers at the downward movement of the spool.

SUMMARY OF THE INVENTION

Accordingly, a pressure control valve of the present invention has housing and a piston member. The piston member is housed in the housing so that it moves between first and second positions. The housing includes a piston chamber for guiding the piston member between first and second positions while keeping a sealing engagement with the piston chamber. First and second chambers are positioned adjacent to opposite ends of the piston member so that volumes of first and second chambers are changed depending upon a movement of the piston member. First and second ports are connected when the piston member takes the first position but disconnected when the piston member takes the second position. Third port is connected with the first and second chambers but disconnected from the first and second ports when the piston member takes the first position but connected with the second port when the piston member takes the second position. A partition is defined between the first and second chambers. Also, the partition has an orifice for connecting between the first chamber and the third port.

DETAILED DESCRIPTION OF THE PREFERRED EMBODIMENTS

Figure 1:
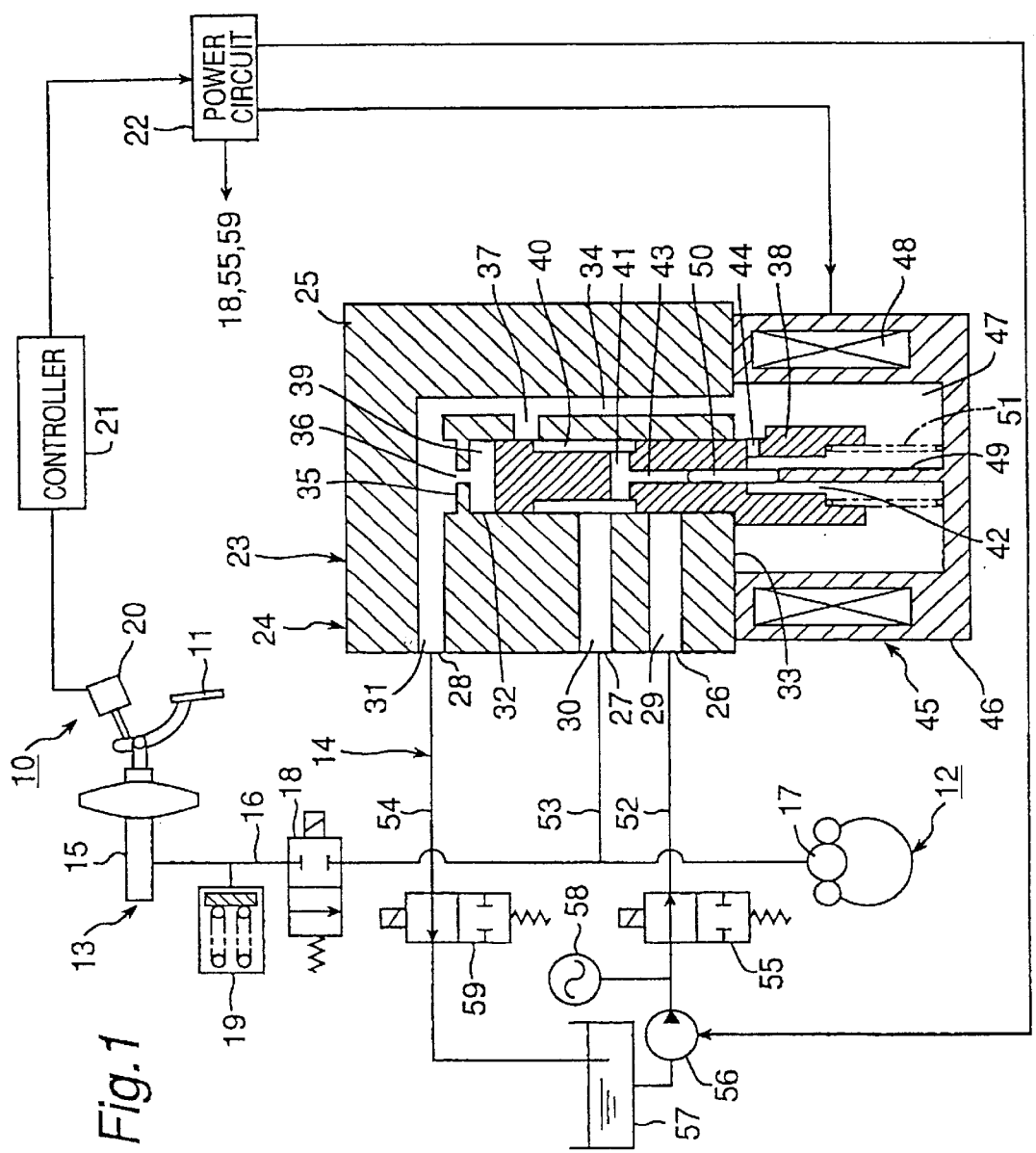
FIG. 1 is a circuit diagram of a brake system, including a cross sectional view of a pressure control valve according to the embodiment of the present invention, in which a spoil or piston member takes an elevated position.
Figure 2:
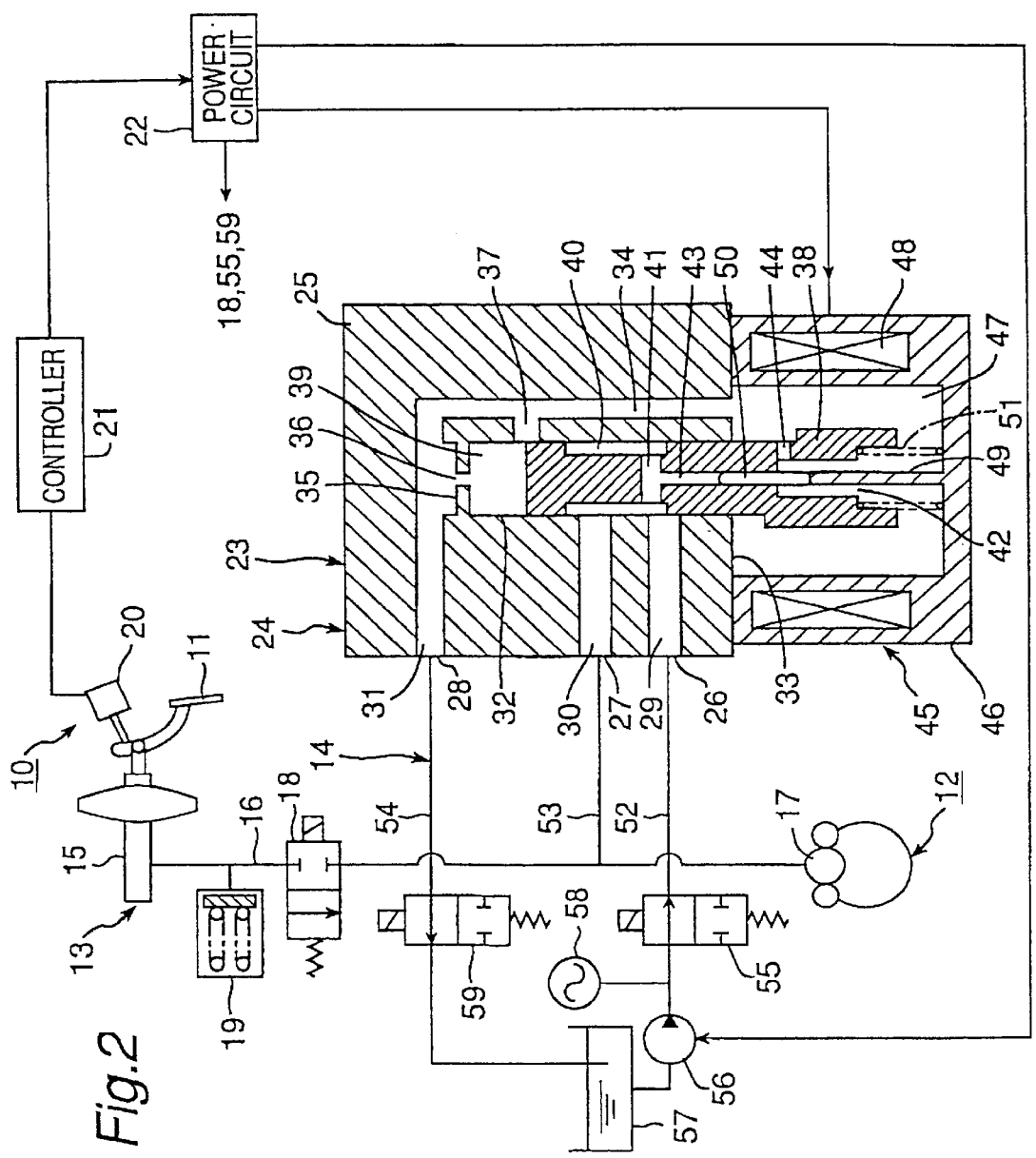
FIG. 2 is a circuit diagram of the brake system shown in FIG. 1, in which the spool takes a lowered position.

Referring to the drawings, in particular FIGS. 1 and 2, there is shown a brake system for use with automobiles, generally indicated by reference numeral 10. The brake system 10 includes a brake pedal 11 that is operated by a driver. The brake pedal 11 is drivingly connected to a wheel system generally indicated by reference numeral 12 through a mechanical subsystem generally indicated by reference numeral 13 and an electromechanical subsystem generally indicated by reference numeral 14. The mechanical subsystem 13 includes a variety of mechanical parts, each of which is operable without any need of electric supply. On the other hand, the electromechanical subsystem 14 includes a variety of mechanical and electrical parts, so that it can be operated only when it is supplied with electric power from a power system. Accordingly, the brake system 10 is designed to use the electromechanical subsystem 14 unless the power system falls into a malfunction due to any trouble. When the malfunction is occurred, the brake system 10 substitutes the mechanical subsystem 13 for the electromechanical subsystem 14.

The mechanical subsystem 13 includes a master cylinder 15 that is driven by a movement of the brake pedal 11. The master cylinder 15 is fluidly connected through a tube or passage 16 to a wheel cylinder 17 provided in wheel system 12. An operating substance or brake oil filled in the passage 16 and cylinders 15 and 17 is transported between the cylinders 15 and 17 in response to the movement of the brake pedal 11. The passage 16 includes a solenoid valve 18 and a stroke simulator 19 provided between the cylinder 15 and the solenoid valve 18. The solenoid valve 18 is designed so that it changes between a first state where it disconnects between the cylinders 15 and 17 and a second state where it connects therebetween. Specifically, as shown in FIG. 1 the solenoid valve 18, when it is supplied with electric power, takes the first state, so that the mechanical subsystem 13 does not transmit the braking force applied to the brake pedal 11 to the wheel system 12. In this instance, the electromechanical subsystem 14 is operated so that the braking operation applied to the brake pedal 11 is transmitted through the electromechanical subsystem 14 to the wheel cylinder 17. On the other hand, the solenoid valve 18 takes the second state when it is not supplied with electric power due to the malfunction of the power system, allowing the mechanical subsystem 13 to work instead of electromechanical subsystem 14. It should be noted that, even when the electromechanical subsystem 14 is operated, the master cylinder 15 works in response to the movement of the brake pedal 11 and, thereby, the brake oil in the master cylinder 15 is transported through the tube 16 to and from the stroke simulator 19.

The electromechanical subsystem 14 has a stroke sensor 20 for sensing the movement of the brake pedal 11. The stroke sensor 20 may be another sensor that can detect a force applied to the brake pedal 11. The stroke sensor 20 is electrically connected with a controller or computer 21 which in turn electrically connected with a power circuit 22 for controlling a pressure control system generally indicated by reference numeral 23 according to the first embodiment of the present invention.

The pressure control system 23 includes a spool valve 24. The spool valve 24 has a housing 25 made of suitable non-magnetic material. The housing 25 has first to third ports 26–28. The first to third ports 26–28 are extended horizontally in the housing 25 through respective passages 29–31. Also the housing 25 includes an elongated piston chamber 32 extending upward from a bottom surface 33 of the housing 25. The piston chamber 32 is connected with the first to third passages 29–31. In this regard, the first and second passages 29 and 30 terminate at the side portion of the piston chamber 32. On the other hand, the third passage 31 is extended horizontally beyond the piston chamber 32, so that the top end of the piston chamber 32 is connected to a mid-portion of the third passage 31. Another elongated passage 34 is formed in the housing 25. The passage 34 is extended vertically from the bottom surface 33 of the housing 25 and then connected to the innermost end of the third passage 31.

In the piston chamber 32 and, in particular, at a certain level between the second and third passages 30 and 31, a partition 35 is integrally formed in the housing 25. The partition 35 has a small through-hole or orifice 36 connecting between the piston chamber 32 and the passage 31. Also, the piston chamber 32 and the vertical passage 34 are connected to one another through a transverse, connecting hole 37 extending therebetween.

A piston member or spool 38 made from magnetic material is received in the piston chamber 32. The spool 38, which is generally outlined by its top and bottom end surfaces and a side peripheral surface extending between top and bottom end surfaces, has an upper reduced portion and a lower enlarged portion. The reduced portion is shaped and sized so that it moves vertically in the piston chamber 32 while an outer surface thereof keeps a sealing engagement with the opposed inner surface of the piston chamber 32. The enlarged portion on the other hand is designed to be larger than the piston-chamber 32. Also, a vertical length of the reduced portion is determined so that, when the spool 38 takes an elevated position (first position) shown in FIG. 1, the spool 38 cooperates with the partition 35 to define a reduced first chamber 39 therebetween.

The upper reduced portion of the spool 38 is formed at its periphery with a channel 40 extending around the reduced portion. The channel 40 is sized and positioned so that at the elevated position (see FIG. 1) it connects between the second passage 29 and the connecting hole 37 but disconnects between the first and second ports 26 and 27. Also, the channel 40 is designed so that, when the spool 38 take a lowered position as shown in FIG. 2, it connects between the first and second ports 26 and 27 and it disconnects between the second passage 30 and the connecting hole 37. A transverse channel 41 is formed in the reduced portion of the spool 38, extending horizontally between the opposite portions of the peripheral channel 40 and crossing the longitudinal axis of the spool 38. An enlarged passage 42 is formed in the enlarged portion of the spool 38, extending vertically from the bottom end of the enlarged portion along the longitudinal axis of the spool 38. The transverse channel 41 and the enlarged passage 42 are connected through a reduced vertical channel 43 extending along the longitudinal axis of the spool 38. Also, the enlarged portion of the spool 38 has a transverse hole 44 defined therein and extending from the inner enlarged passage 42 to outer periphery thereof.

An electromagnetic device generally indicated by reference numeral 45 is fixed on the bottom surface 33 of the housing 25. The electromagnetic device 45 has a second housing or casing 46. The casing 46 has a bottom portion and a peripheral portion extending upward from the peripheral edge of the bottom portion to define a second chamber 47 therein.

The peripheral portion includes therein a coil 48 electrically connected with the power circuit 22. The bottom portion supports a rod 49 positioned at the center of the peripheral portion and extending vertically. The rod 49 is sized to have substantially the same cross section as the channel 43 formed in the reduced portion of the spool 38. Also, an upper portion of the rod 49 is in part removed along its longitudinal direction to form a narrow cutout. This results in that, when the rod 49 is inserted in the vertical channel 43, a narrow channel 50 is defined corresponding; to the cutout between the rod 49 and the vertical channel 43 to connect between the transverse channel 41 and the enlarged passage 42.

The casing 46 is fixed to the bottom surface of the housing 25 with its vertical axis aligned to the longitudinal axis of the piston chamber 32 and with the rod 49 inserted in the vertical channel 43. Also, a bias spring 51 is provided in the second chamber 47 for biasing the spool 38 into the elevated position shown in FIG. 1.

First to third channels or tubes 52–54 are connected with the first to third ports 26–28, respectively. The first channel 52 is connected through a solenoid valve 55 and a pump 56 with a reservoir 67 for receiving the operating or working fluid, i.e., brake oil. An accumulator 58 is connected to the passage 52 between the solenoid valve 55 and the pump 56. The second channel 53 is connected with the passage 16 between the wheel cylinder 17 and the solenoid valve 18. The third channel 54 is extended through a solenoid valve 59 into the brake oil received in the reservoir 57.

The pump 56 is electrically connected to the power circuit 22. Also, the solenoid valves 55 and 59 as well as 18 are electrically connected with the power circuit 22. In particular, the solenoid valves 55 and 59 in the electromechanical subsystem 14 are designed so that, when they are supplied with electric power from the power circuit 22, they take an operable state in which the brake oil can pass therethrough but, when they are not supplied with electric power, they take an inoperable state in which the brake oil is prohibited from being transported therethrough.

In operation of the mechanical subsystem 13, the solenoid valves 55 and 59 are kept opened, so that the brake oil is transported through respective channels 52 and 54. In this instance, the solenoid valve 18 mounted in the mechanical subsystem 13 is set to close the channel 16, so that no brake oil is transported between the cylinders 15 and 17.

Under the condition that the first and second chambers and other passages formed in the spool valve 24 are filled with brake oil, when brake pedal 11 is biased, the brake oil in the mechanical subsystem 13 is forced from the master cylinder 15 through the channel 16 into the stroke simulator 19. Subsequently, when the brake pedal 11 is released from the bias force, the brake oil is returned from the stroke simulator 19 through the passage 16 into the master cylinder 15.

In the electromechanical subsystem 14, the movement of the brake pedal 11 is detected by the stroke sensor 20, which in turn transmits a corresponding signal to the controller 21. A voltage or other parameter of the signal varies depending upon the movement of the brake pedal 11. Then, the controller 21 transmits a signal to the power circuit 22, which in turn applies a corresponding voltage to the coil 48. This causes the spool 38 to move toward its lowermost position shown in FIG. 2 where the first and second ports 26 and 27 are connected to one another. Simultaneously or immediately after the movement of the spool 38, the power circuit 22 energizes the pump 56. Consequently, the brake oil is transported from the reservoir 57 through opened solenoid valve 55, first passage 29, channel 40, second passage 30 and channel 16 into the wheel cylinder 17, causing the braking pressure to be applied to the brake disc not shown in the wheel system 12. An open ratio or opened area of a first valve defined by the channel 40 and passage 29 is adjusted according to the movement of the brake pedal 11 and the corresponding signal from the stroke sensor 20 to the controller 21. This means that an amount of brake oil transported into the wheel cylinder 17 is controlled by the movement of the brake pedal 11.

The downward movement of the spool 38 causes the volume of the second chamber 47 to decrease, which results in the pressure increase in the second chamber 47. On the other hand, the downward movement of the spool 38 results in the volume increase in the first chamber 39, which causes the pressure decrease in the first chamber 39. The pressure decrease in the first chamber 39 is compensated by the supplemental brake oil that is supplied from the reservoir 57 and also from the second chamber 47. At this moment, the orifice 36 has a small area and then provides a restriction force to the brake oil flowing therethrough, which prevents the spool 38 to move rapidly. This ensures the steady-state characteristics of the brake system 10.

As best shown in FIG. 2, when the spool 38 stays in the lowered state, the first passage 29 is connected through channels 40, 41, 43 and 50 to the enlarged passage 42 in the second chamber 47. Therefore, when the brake pedal 11 is kept forced, the pump 56 continues to feed the brake oil from the reservoir 57 into the spool valve 24. The fed brake oil is transported through the first passage 29, channels 40, 41, 43 and 50 into the enlarged passage 42 in the second chamber 47. The narrow channel 50 has a small cross sectional area so that a required pressure for braking can be maintained in the wheel cylinder 17. Advantageously, the continuously fed brake oil generates a flow of brake oil from the second chamber 47 through the passages 34, 31 and 54 into the reservoir 57. With an aid of the oil flow, bubbles that may exist in the second chamber 47 are transported directly or through the transverse hole 44 into the vertical passage 34. Then, the bubbles in the passage 34 are transported through the passages 31 and 54 and braking oil in the reservoir 57 into the air. The bubbles released into the air will never be returned in the brake oil within the spool valve 24 even at the upward movement of the spool.

Subsequently, if the brake pedal 11 is released and then returned toward its unbiased initial position, the controller 21 instructs the power circuit 22 to de-energize the pump 56. At the same time, the power circuit 22 de-energizes the coil 48, which allows the spool 38 to move into the elevated position shown in FIG. 1 due to the spring bias from the spring 51. In the elevated position, the channel 40 is disconnected from the first passage 29 but it is connected to the hole 37. That is, the channel 40 cooperates with the hole 37 to define a second valve in the piston valve. Consequently, the brake oil in the wheel cylinder 17 flows out through the channels 16, 53, 30, 40 and 37 into passage 34 and then through channels 31 and 54 into the reservoir 57, which removes the elevated pressure from the wheel cylinder 17. An open ratio of the second valve defined by the channel 40 and the hole 37 depends on the movement of the spool 38, i.e., releasing movement of the brake pedal 11.

In addition, the volume in the second chamber 47 increases with the upward movement of the spool 38, which decreases the pressure in the second chamber 47. The pressure decrease is compensated by the brake oil discharged from the hole 37. On the other hand, the volume in the first chamber 39 is increased with the upward movement of the spool 38. This causes the brake oil in the first chamber 39 to flow out through the orifice 36 into the passage 31. At this moment, since the orifice 36 has a small area, the brake oil flowing through the orifice suffers from a restriction force. This prevents the rapid movement of the spool 38, ensuring the steady-state characteristics of the spool valve 24.

Bubbles that may exist in the first chamber 39 are removed through the orifice 36 by the oil flow generated by the upward movement and the resultant reduction in volume of the first chamber 39. The bubbles are then transported with the flow of brake oil toward the reservoir 57 and then released into the air. The bubbles released into the air will never be returned to the brake oil even when the spool 38 moves to the lowered position.

It should be noted that, as best shown in FIG. 2, the connection hole 37 is configured and sized so that it is in part opened to the first chamber when the spool 38 takes the lowermost position and then it is completely closed when the spool 38 moves up a certain distance from the lowermost position. This allows that, once the brake pedal 11 is released from the biasing force, the piston moves up quickly in the initial stage of the upward movement.

Figure 3:
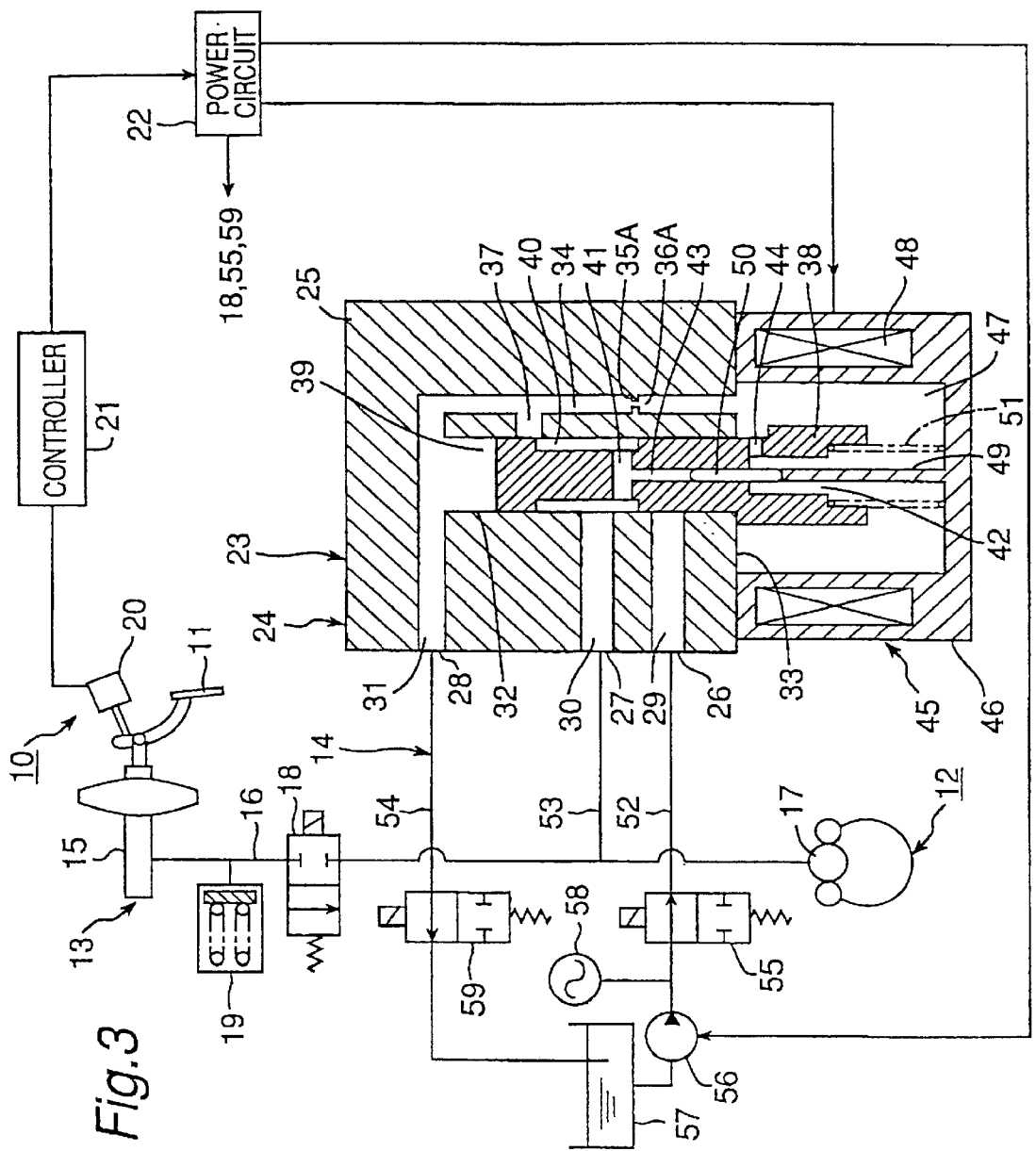
FIG. 3 is a circuit diagram of a brake system, including a cross sectional view of a pressure control valve according to another embodiment of the present invention.
Figure 4:
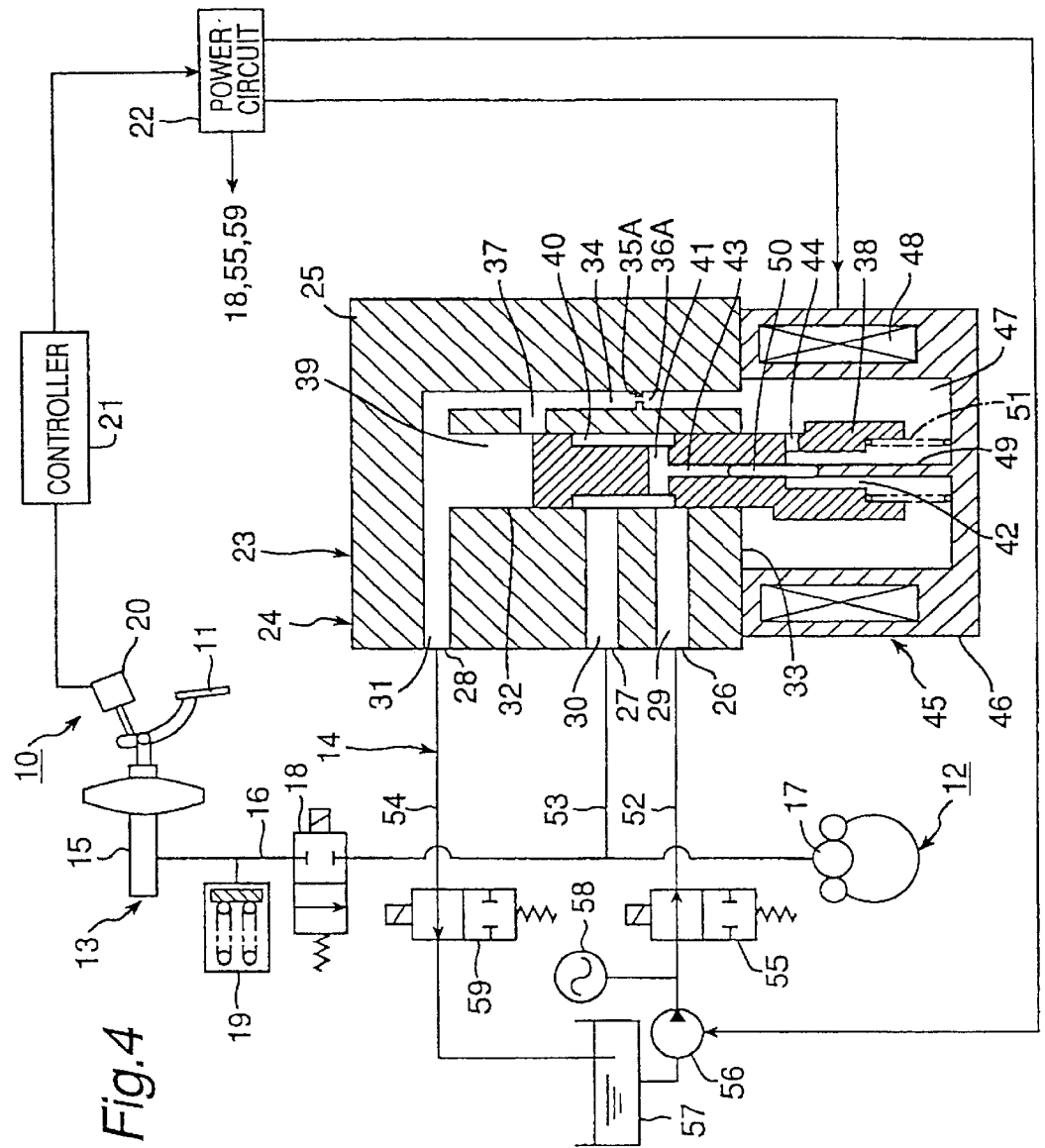
FIG. 4 is a circuit diagram of the brake system shown in FIG. 4, in which the spool takes a lowered position.
Figure 5:
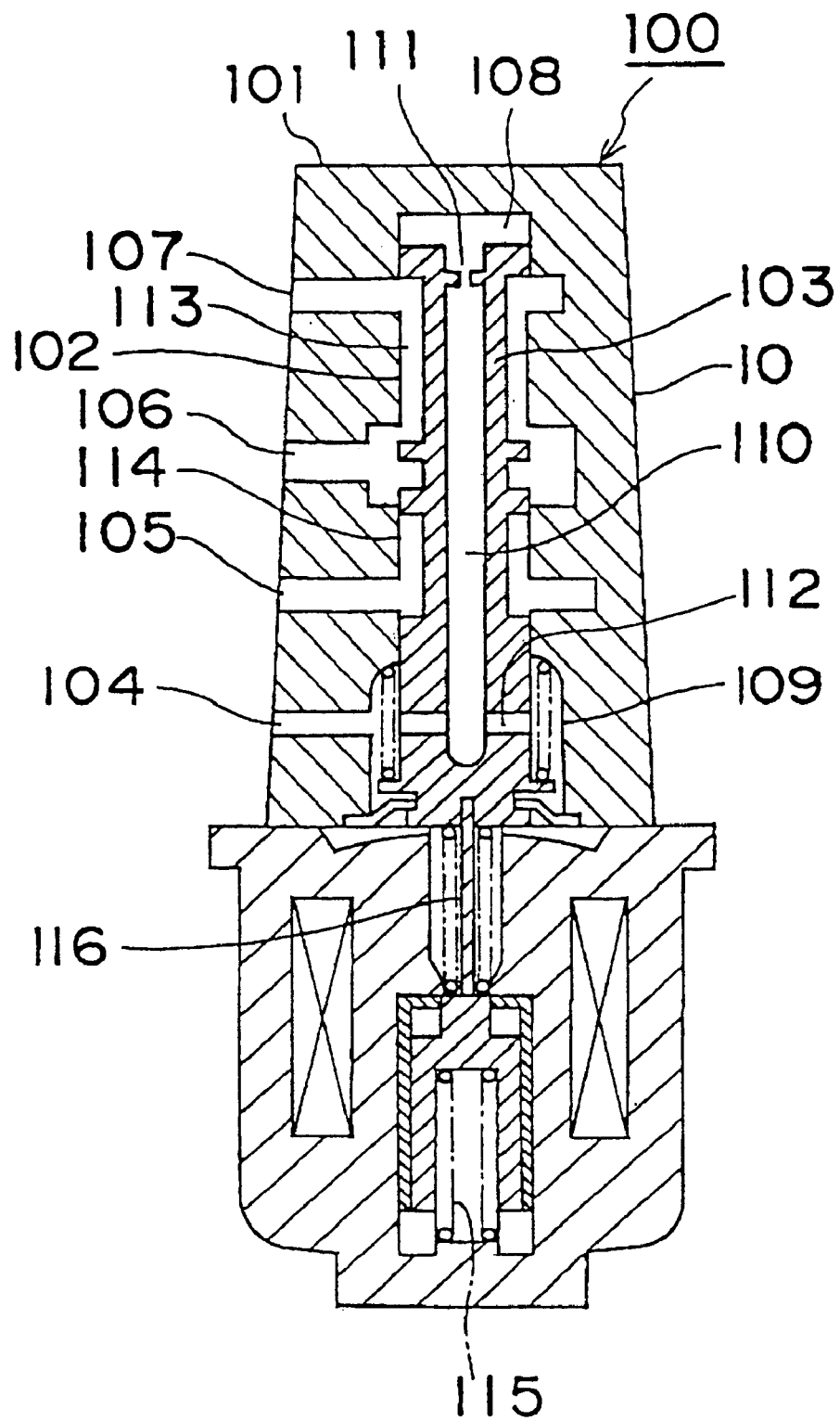
FIG. 5 is a cross sectional view of a conventional proportional pressure control valve.

Although in the previous embodiment the partition 35 with orifice 36 is formed above the spool 38 in the piston chamber 32, it may be positioned in the vertical passage 34 as shown in FIGS. 3 and 4. In this embodiment, the partition 35A with orifice 36A is preferably positioned below the hole 37.

According to the second arrangement, when the spool 38 moves from the elevated position (see FIG. 3) toward the lowered position (see FIG. 4), a part of the brake oil in the second chamber 47 is forced out through the orifice 36A. At this moment, the brake oil moving past the orifice 36A suffers from a restriction force, which prevents the rapid movement of the spool 38. In addition, when the brake pedal 11 is kept biased, the pressurized brake oil continues to be transported through the channels 52, 29, 40, 41, 43 and 50 into the second chamber 47. The additional brake oil makes a continuous flow of oil from the second chamber 47 to the reservoir 57. Therefore, the possible air or bubbles in the second chamber 47 is removed therefrom by the flow of the brake oil. The removed bubbles are then transported to the reservoir 57 where they are released into the air.

When the brake pedal 11 is released from the biasing force, the spool 38 moves from its lowered position to its elevated position. This causes the brake oil in the reservoir 57 to be transported through the orifice 36A into the second chamber 47. At this moment, the brake oil flowing past the orifice 36A suffers from a restriction force, which prevents the rapid movement of the spool 38. Simultaneously with this, the pressurized brake oil is returned from the wheel cylinder 17 to the reservoir 57.

As can be seen from above, the bubbles in the chambers in the spool valve are well removed during the operations of the spool valve. This means that no additional operation is needed for removing bubbles from the chambers in the spool valve. Also, the spool valve system is ensured to have steady state, responsible operational features.

It should be noted that the present invention has been described with the specific embodiments of the present invention, it is not limited thereto but can be applicable to other apparatus or system using such proportional pressure control valve.

The present disclosure relates to subject matter contained in priority Japanese Patent Application No. HEI 11-244581, filed on Aug. 31, 1999, the contents of which is herein expressly incorporated by reference in its entirety.

What is claimed is:

1. A valve, comprising:

a housing; and a piston member, said piston member being mounted in said housing so that said piston member moves between first and second positions;

wherein said housing includes:
 a piston chamber for guiding said piston member between said first and second positions while keeping a sealing engagement with said piston chamber;
 first and second chambers adjacent to opposite ends of said piston member, volumes of said first and second chambers being changed depending upon a movement of said piston member;
 first to third ports, said first and second ports being connected when said piston member takes said first position but disconnected when said piston member takes said second position, said third port being connected with said first and second chambers and being disconnected from said first and second ports when said piston member takes said first position but connected with said second port when said piston member takes said second position;
 a partition defined between said first and second chambers, said partition having an orifice extending therethrough to connect between said first chamber and said third port; and
wherein said piston member has a channel, said channel connecting between said first port and said second chamber when said piston member takes said first position.

2. A valve in accordance with claim 1, wherein said housing has a passage connecting said third port and said first and second chambers, and said partition with said orifice is provided between said first chamber and said passage.

3. A valve in accordance with claim 1, wherein said housing has a passage extending between said first and second chambers, and said partition with said orifice is provided in said passage.

4. A valve, comprising:

(a) a housing; and (b) a piston member having upper and lower ends, said piston member being housed in said housing so that said piston member moves up and down along a vertical axis thereof between elevated and lowered positions; wherein (c) said piston member includes a channel formed in a surface extending between said upper and lower ends;

(d) said housing is formed with
 a piston chamber for guiding said piston member while keeping a sealing engagement with said piston member;
 an upper chamber that is in part defined by said upper end of said piston member;
 a lower chamber that is in part defined by said lower end of said piston member;
 first to third ports;
 a first passage, said first passage being connected at one end thereof with said first port and connected at the other end with said channel of said piston member when said piston member takes said lowered position but disconnected with said channel when said piston member takes said elevated position;

a second passage, said second passage being connected at one end thereof with said second port and connected at the other end thereof with said channel of said piston member when said piston member takes said elevated and lowered positions;

a third passage, said third passage being connected at one end thereof with said third port and connected at the other end thereof with said upper and lower chambers; and a partition defined between said upper and lower chambers, said partition having a hole connecting between said upper and lower chambers.

5. A valve in accordance with claim 4, wherein said partition with said hole is positioned in said third passage.

6. A valve in accordance with claim 5, wherein said fourth passage is sized to provide a restriction force to a fluid moving from said channel to said second chamber.

7. A valve in accordance with claim 4, wherein said housing has a hole connecting between said third passage in said housing and said channel in said piston member.

8. A valve in accordance with claim 4, wherein said piston member has a fourth passage for connecting between said channel in said piston member and said second chamber.

9. A valve in accordance with claim 4, further comprises drive means for moving said piston member between said elevated and lowered positions.

10. A valve in accordance with claim 4, further comprises biasing means for biasing said piston member into said elevated position.

11. A valve, comprising:

a housing; and a piston member, said piston member being mounted in said housing so that said piston member is configured to move between first and second positions;

wherein said housing includes:

a piston chamber for guiding said piston member between said first and second positions while keeping a sealing engagement with said piston chamber;

first and second chambers adjacent to opposite ends of said piston member, volumes of said first and second chambers being changed depending upon a movement of said piston member;

first to third ports, said first and second ports being connected when said piston member takes said first position and disconnected when said piston member takes said second position, said third port being connected with said first and second chambers and being disconnected from said first and second ports when said piston member takes said first position but connected with said second port when said piston member takes said second position;

a partition defined between said first and second chambers, said partition having an orifice extending therethrough to connect between said first chamber and said third port; and wherein said piston member has a channel, said channel connecting between said second port and said second chamber when said piston member takes said second position.

12. The valve in accordance with claim 11, wherein said housing has a passage connecting said third port and said first and second chambers, and said partition with said orifice is provided between said first chamber and said passage.

13. The valve in accordance with claim 11, wherein said housing has a passage extending between said first and second chambers, and said partition with said orifice is provided in said passage.

* * * * *